(12) United States Patent
Claussen et al.

(10) Patent No.: US 11,667,034 B2
(45) Date of Patent: Jun. 6, 2023

(54) COMPUTERIZED SYSTEM AND METHOD USING DIFFERENT IMAGE VIEWS TO FIND GRASP LOCATIONS AND TRAJECTORIES FOR ROBOTIC PICK UP

(71) Applicant: Siemens Aktiengesellschaft, Munich (DE)

(72) Inventors: Heiko Claussen, North Brunswick, NJ (US); Martin Sehr, Kensington, CA (US); Eugen Solowjow, Berkeley, CA (US); Chengtao Wen, Redwood City, CA (US); Juan L. Aparicio Ojea, Moraga, CA (US)

(73) Assignee: Siemens Aktiengesellschaft, Munich (DE)

( * ) Notice: Subject to any disclaimer, the term of this patent is extended or adjusted under 35 U.S.C. 154(b) by 512 days.

(21) Appl. No.: 16/788,840

(22) Filed: Feb. 12, 2020

(65) Prior Publication Data

US 2020/0262064 A1    Aug. 20, 2020

(30) Foreign Application Priority Data

Feb. 15, 2019    (EP) .................................... 19157525

(51) Int. Cl.
*G06F 19/00* (2018.01)
*B25J 9/16* (2006.01)

(52) U.S. Cl.
CPC .............. *B25J 9/1664* (2013.01); *B25J 9/162* (2013.01); *B25J 9/1669* (2013.01); *B25J 9/1697* (2013.01); *G05B 2219/39484* (2013.01)

(58) Field of Classification Search
CPC ........ B25J 9/1664; B25J 9/162; B25J 9/1669; B25J 9/1697; G05B 2219/39484
See application file for complete search history.

(56) References Cited

U.S. PATENT DOCUMENTS 9,102,055 B1    8/2015 Konolige et al.
9,669,543 B1 *  6/2017 Stubbs ................... B25J 9/1612
(Continued)

FOREIGN PATENT DOCUMENTS

CN    101896321 A    11/2010
WO    2011161304 A1   12/2011
(Continued)

OTHER PUBLICATIONS

"Sequential View Grasp Detection for Inexpensive Robotic Arms" published by Arxiv.org, Cornell University library ("Gualtieri'Cornell") (Year: 2016).*

(Continued)

*Primary Examiner* — Harry Y Oh
*Assistant Examiner* — Sohanatanju Khayer

(57) ABSTRACT

Computerized system and method are provided. A robotic manipulator (12) is arranged to grasp objects (20). A gripper (16) is attached to robotic manipulator (12), which includes an imaging sensor (14). During motion of robotic manipulator (12), imaging sensor (14) is arranged to capture images providing different views of objects in the environment of the robotic manipulator. A processor (18) is configured to find, based on the different views, candidate grasp locations and trajectories to perform a grasp of a respective object in the environment of the robotic manipulator. Processor (18) is configured to calculate respective values indicative of grasp quality for the candidate grasp locations, and, based on the calculated respective values indicative of grasp quality for the candidate grasp locations, processor (18) is configured to select a grasp location likely to result in a successful grasp of the respective object.

15 Claims, 5 Drawing Sheets

(56) References Cited

U.S. PATENT DOCUMENTS

| | | | |
|---|---|---|---|
| 9,914,213 | B2 | 3/2018 | Vijayanarasimhan et al. |
| 9,981,382 | B1 | 5/2018 | Strauss et al. |
| 10,455,212 | B1* | 10/2019 | Konolige .............. H04N 13/122 |
| 10,981,272 | B1* | 4/2021 | Nagarajan .............. B25J 9/1669 |
| 2009/0105880 | A1* | 4/2009 | Okazaki ................ B25J 9/1633 |
| | | | 700/258 |
| 2013/0151007 | A1* | 6/2013 | Valpola ................ B25J 9/1697 |
| | | | 901/9 |
| 2014/0163737 | A1* | 6/2014 | Nagata .................. B25J 9/1697 |
| | | | 700/259 |
| 2016/0335496 | A1* | 11/2016 | Hinterstoisser ...... G06K 9/6215 |
| 2018/0282065 | A1* | 10/2018 | Wagner .................. B07C 3/008 |
| 2019/0001508 | A1* | 1/2019 | Li ........................ G05B 13/041 |
| 2019/0087976 | A1* | 3/2019 | Sugahara ................ G06T 7/75 |
| 2019/0176348 | A1* | 6/2019 | Bingham ............. B25J 15/0004 |
| 2019/0248003 | A1* | 8/2019 | Nagarajan ............ B25J 9/1697 |
| 2019/0337152 | A1* | 11/2019 | Homberg ............... B25J 9/1697 |
| 2020/0078941 | A1* | 3/2020 | Oka ...................... B25J 9/1666 |
| 2020/0094405 | A1* | 3/2020 | Davidson ................ B25J 9/161 |
| 2020/0189097 | A1* | 6/2020 | Ikeda .................... B25J 9/1697 |
| 2020/0189105 | A1* | 6/2020 | Wen ...................... B25J 9/1669 |
| 2020/0230821 | A1* | 7/2020 | Watanabe ............. B25J 9/1697 |

FOREIGN PATENT DOCUMENTS

| | | |
|---|---|---|
| WO | 2017007539 A1 | 1/2017 |
| WO | 2018236753 A1 | 12/2018 |

OTHER PUBLICATIONS

"High precision grasp pose detection in dense clutter", IEEE ("Guaitieri'IEEE") (Year: 2016).*

Marcus Gualtieri et al: "Sequential View Grasp Detection For Inexpensive Robotic Arms", EPO Form 1703 01.91TRI arxiv.org, Cornell University Library, 201 Olin Library Cornell University Ithaca, NY 14853, Sep. 16, 2016 (Sep. 16, 2016); XP080727290.
Gualtieri Marcus et al: "High precision grasp pose detection in dense clutter"; 2016 IEEE/RSJ International Conference on Intelligent Robots ANO Systems (IROS), IEEE, Oct. 9, 2016 (Oct. 9, 2016), pp. 598-605, XP033011464; DOI: 10.1109/IROS.2016.7759114.

* cited by examiner

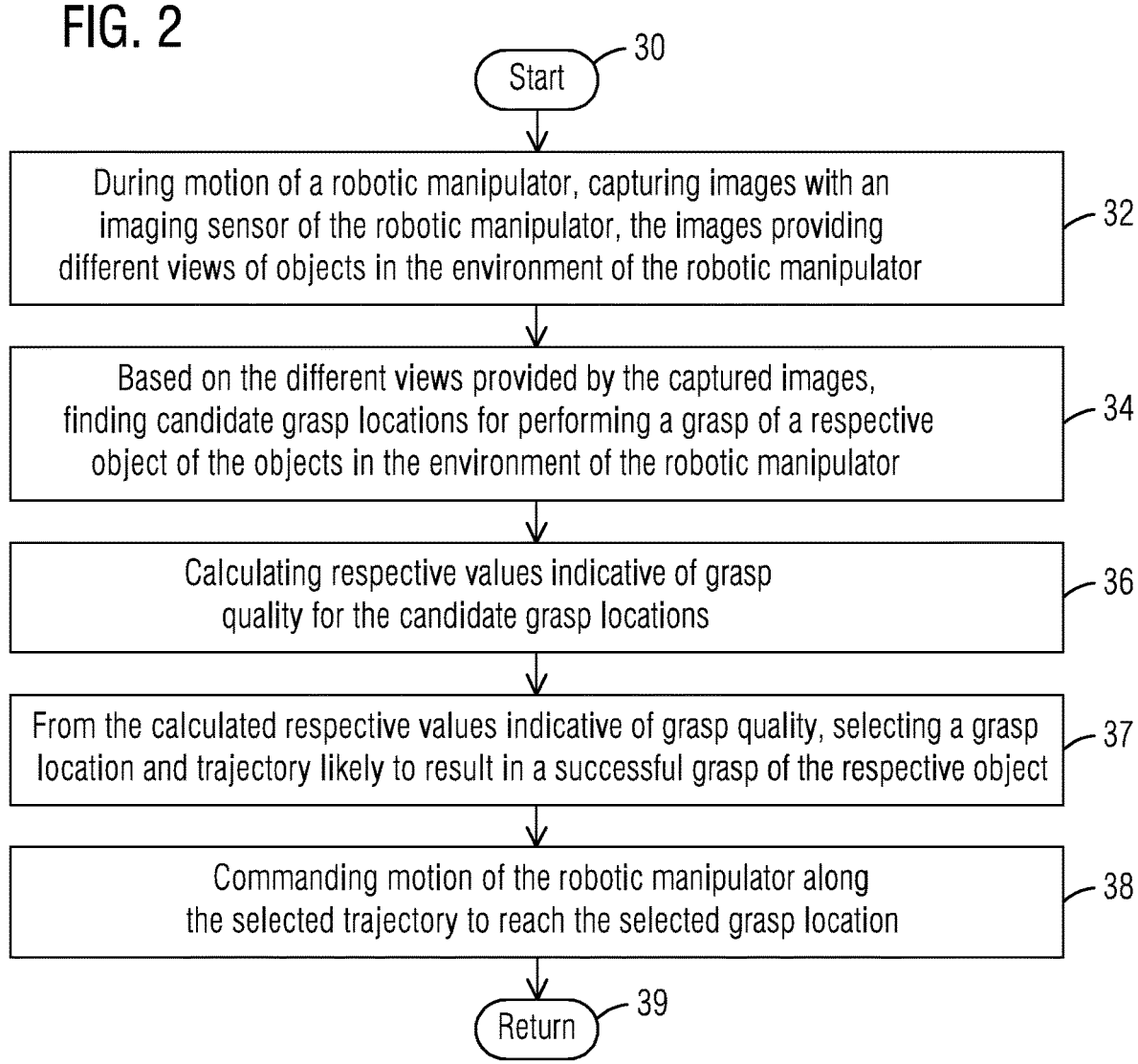

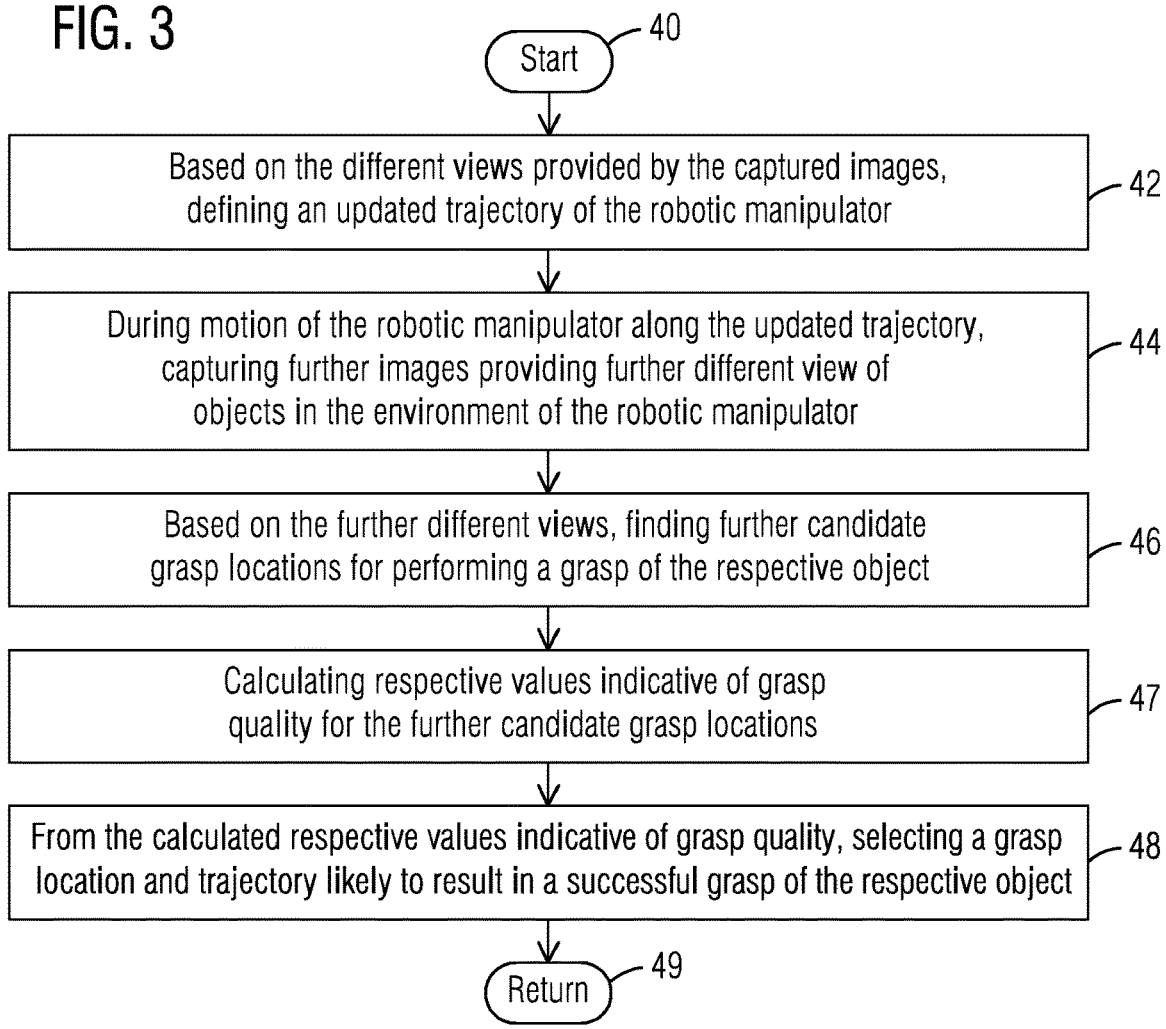
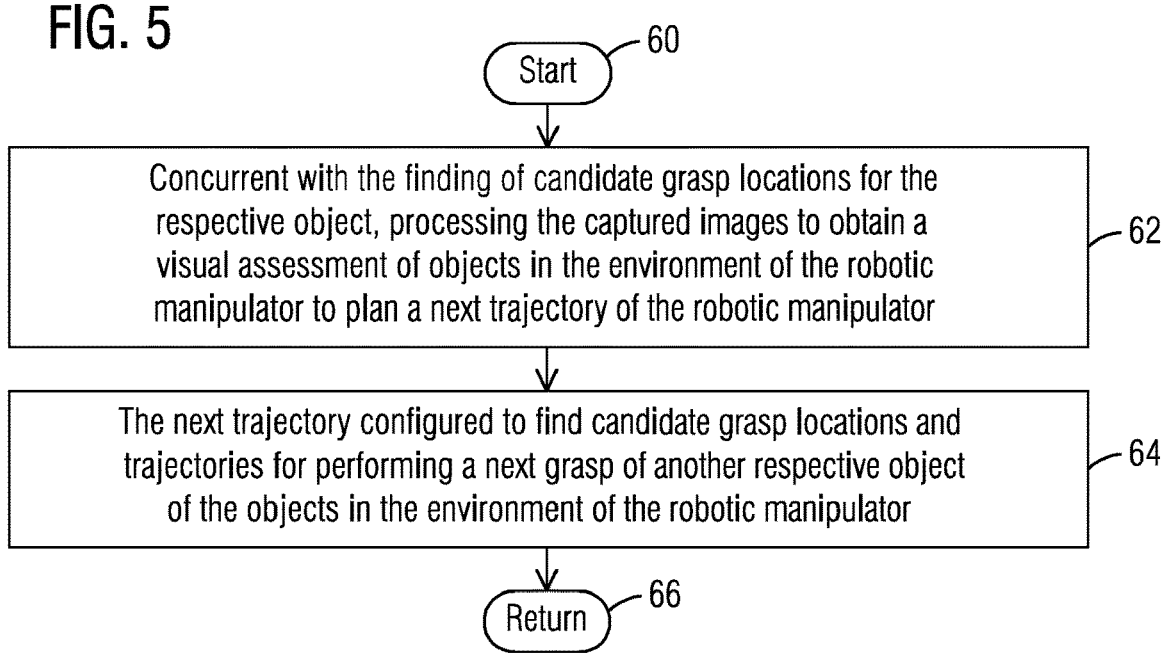

COMPUTERIZED SYSTEM AND METHOD USING DIFFERENT IMAGE VIEWS TO FIND GRASP LOCATIONS AND TRAJECTORIES FOR ROBOTIC PICK UP

BACKGROUND

1. Field

Disclosed embodiments relate generally to the field of autonomous robotics, and, more particularly, to system and method involving a robotic manipulator for grasping objects, and, even more particularly, to computerized system and method involving images arranged to provide different views of objects to be robotically picked up to find grasp locations and trajectories likely to result in a successful grasp.

2. Description of the Related Art

Automation of tasks—e.g., in an industrial setting, such as may involve assembly, warehouse stocking, packaging; or in a home automated setting and in other settings that may make use of autonomous systems—is increasingly performed by robots. Robots have proven effective at performing repetitive tasks with little or no user intervention. One challenge that must be solved to cost-effectively and reliably realize such tasks involves robotic picking and handling of objects.

Certain known approaches may involve precise positioning, and detailed programming of each robot position for a grasp of an object, and this positioning typically has to be known by a robot controller a-priori. Accordingly, the control algorithms have to be rewritten or tailored for every new object to be handled by a given robot. This is only feasible for mass production or repetitive handling of identical objects by similarly-programmed robots.

Certain alternative known approaches may involve Computer Aided Design (CAD) files or other model information for each object to be handled, with the goal of automating the process to find a suitable picking location, also called grasp. However, such approaches may not be feasible in flexible, dynamically changing environments, such as is generally the case in warehouse applications, where one can expect thousands or even millions of different and continuously changing objects, or in home automation applications, where robots have to handle objects that may be unknown during algorithm design, training, and validation.

Similar scenarios can be expected to arise throughout any Industry 4.0 inspired flexible production facilities, for example, aiming to improve: productivity (such as by substantially reducing the time elapsed from the development of a new product to its delivery to customers in the market); efficiency (e.g., automation allows for greater flexibility, better quality of products and more efficient production); and energy savings (e.g., reducing the time for performing robotic tasks), and thus reducing use of electrical energy for performing such tasks. For one example of one inventory system involving a robotic arm for grasping inventory items of the inventory system, see U.S. Pat. No. 9,914,213.

BRIEF DESCRIPTION

A disclosed embodiment is directed to a computerized method. During motion of a robotic manipulator arranged to grasp objects in an environment of the robotic manipulator, images may be captured with an imaging sensor of the robotic manipulator. The images may provide different views of one or more objects of the objects in the environment of the robotic manipulator. Based on the different views provided by the captured images, one may find candidate grasp locations for performing a grasp of a respective object of the one or more objects of the objects in the environment of the robotic manipulator. Respective values indicative of grasp quality may be calculated for the candidate grasp locations. Based on the calculated respective values indicative of grasp quality for the candidate grasp locations, selecting a grasp location and trajectory likely to result in a successful grasp of the respective object of the one or more objects of the objects in the environment of the robotic manipulator. Motion of the robotic manipulator is commanded along the selected trajectory to reach the selected grasp location.

A further disclosed embodiment is directed to a computerized system. A robotic manipulator may be arranged to grasp objects in an environment of the robotic manipulator. The robotic manipulator includes an imaging sensor. A gripper is attached to the robotic manipulator. During motion of a robotic manipulator, the imaging sensor may be arranged to capture images providing different views of one or more objects of the objects in the environment of the robotic manipulator. A processor may be configured to find, based on the different views provided by the captured images, candidate grasp locations to perform a grasp of a respective object of the one or more objects of the objects in the environment of the robotic manipulator. The processor is configured to calculate respective values indicative of grasp quality for the candidate grasp locations. Based on the calculated respective values indicative of grasp quality for the candidate grasp locations, the processor is configured to select a grasp location and trajectory likely to result in a successful grasp of the respective object of the one or more objects in the environment of the robotic manipulator. The processor is further configured to command motion of the robotic manipulator along the selected trajectory to reach the selected grasp location.

BRIEF DESCRIPTION OF THE DRAWINGS

FIGS. 2-5 illustrate respective flowcharts depicting non-limiting embodiments of workflow of actions or steps that may be involved in a disclosed computerized method for robotically picking up objects.

DETAILED DESCRIPTION

The present inventors have recognized that grasp success rate in certain known approaches may be negatively affected by limited information on the 3-D geometries of the objects to be handled. One reason for this limited information may be due to occlusions caused by other objects in an environment of the robotic manipulator.

Another reason that may cause the limited information on the 3-D geometries of the objects to be handled may arise from the generally fixed viewpoint of a camera that may be used for viewing the objects to be grasped. That is, the objects may be placed randomly in the environment of the robotic manipulator, but such objects may just be visible from a singular, fixed direction of the camera. Therefore, the actual physical configuration (e.g., the physical features, weight distribution, etc.) of a given object can be substantially different from what is perceived given the singular, fixed directional view of the object provided by the camera. In some situations, portions of a given object may be hidden in the singular view of the object provided by the camera. For example, the handle of a coffee mug or cup could be hidden in the singular view provided by the camera. And consequently, in this example, identification of one suitable grasp location for picking up the cup would not be feasible.

Figure 6:
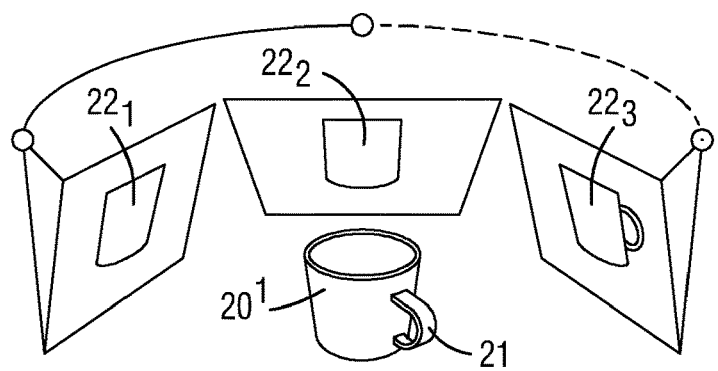
FIG. 6 illustrates a non-limiting example of a sequence of different views of a given object, such as a coffee mug.

The foregoing example may be visualized in FIG. 6, which illustrates a non-limiting example of a sequence of different views of a given object, such as a coffee mug $20^1$. Different viewpoints yield different visual appearance of the same object, as can be appreciated in images $22_1$, $22_2$ and $22_3$. In this example, the handle 21 of coffee mug $20^1$ is only observable in image $22_3$.

Additionally, in certain known approaches, once a successful grasp of a given object has been performed, there may be a need to retract (e.g., move away) the robotic manipulator out of the viewing area monitored by the camera in order to view candidate grasping locations for remaining objects. This retraction of the robotic manipulator consumes valuable time considering the substantially large number of objects that, for example, may be involved in an industrial setting. Furthermore, evaluating acceptability of grasping locations, in at least some known approaches, may involve a large number of tries of candidate grasp locations and concomitant evaluation of grasping quality. During this evaluating, the robotic manipulator may not be moving towards a next grasp location, once again consuming valuable time.

Disclosed embodiments solve at least the foregoing issues by placing an imaging sensor (e.g., a camera that may be configured to generate 3-D point cloud of a given scene) on the robotic manipulator (e.g., robot arm/s) and processing a grasp quality on-the-fly, such as by way of a convolutional neural network, while allowing movement of the robotic manipulator. Without limitation, real-time assessment of the grasp quality may be realized by way of dedicated edge Artificial Intelligence (AI) hardware accelerators. When moving the robotic manipulator along a given trajectory, the view provided by such imaging sensor of an object is naturally changing, therefore unveiling alternative grasping locations.

Without limitation, desirable grasp candidate may be stored while continuously trying for alternative grasp candidates that may replace a present grasp candidate, subject to an anticipated quality difference threshold. The search to find better grasp candidates may be based on stochastic optimization, such as without limitation a simulated annealing approach. That is, an initial grasp location may be established by a predefined policy (such as without limitation, availability of flat surfaces on the object, identification of a location in the object smaller than a maximum grasp width, proximity to estimated center of gravity of the object, etc.)

Without limitation, random locations may then be evaluated, such as initially allowing a relatively large physical distance to the best grasp location found so far, and then over time iteratively reducing this variance. Once converged, if there is additional time before the grasp needs to be executed, a second starting point may be initialized and iteratively optimized. Eventually, a set of different maximally-promising grasp locations at maximally different locations may be stored. In addition, provided the initial grasp quality prediction is acceptable, new grasp locations may be evaluated along the trajectory of the robot arm to that location, allowing refinement of the planned trajectory or re-planning for a better grasp candidate.

Without limitation, the environment reconstruction and the grasping tasks may be decoupled. The system may calculate new trajectories based on a target object to be grasped and its understanding of the environment, which may be obtained during current and past motion of the robotic manipulator. For example, stored successful grasping locations and trajectories can be utilized to further improve grasping quality and reduce the time to find better grasp candidates.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

Figure 1:
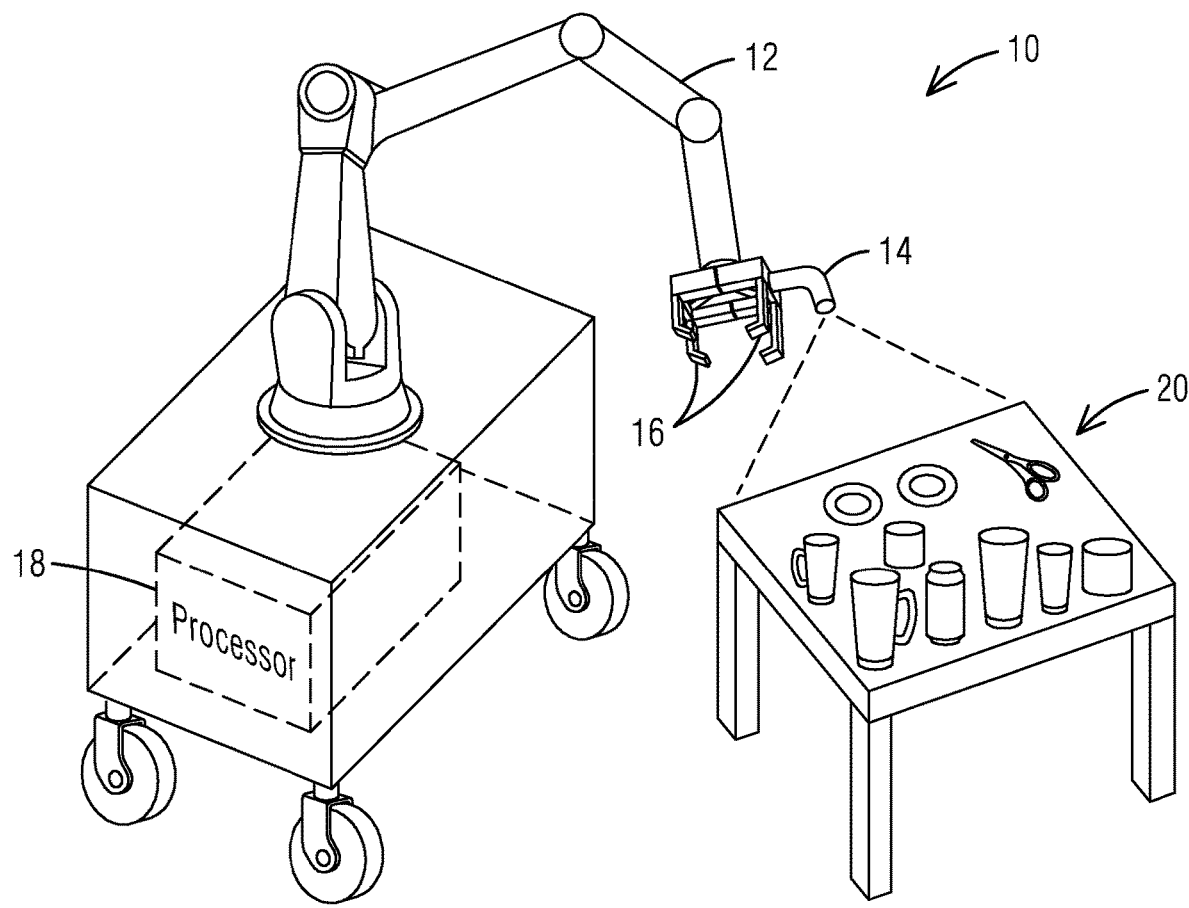
FIG. 1 illustrates a schematic diagram of one non-limiting embodiment of a disclosed computerized system involving a robotic manipulator for picking up objects.

FIG. 1 illustrates a schematic diagram of one non-limiting embodiment of a disclosed computerized system 10 involving a robotic manipulator 12 for grasping objects 20 in an environment of the robotic manipulator. Robotic manipulator 12 includes an imaging sensor 14, such as, without limitation, a camera that may be configured to generate a three-dimensional (3-D) point cloud of a given scene. A gripper 16 may be attached to robotic manipulator 12. It will be appreciated that, without limitation, alternatively, one can construct a 3-D image from different images of a standard two-dimensional (2-D) camera by recording the images from different viewpoints, as could be implemented with such a camera located at the robotic manipulator.

As may be appreciated in FIG. 2, subsequent to a start step 30, as shown in block 32, during motion along a given trajectory of robotic manipulator 12, imaging sensor 14 (FIG. 1) may be arranged to capture images providing different views of one or more objects of the objects 20 in the environment of the robotic manipulator. As noted above, without limitation such images could be 3-D images (e.g., RGB-D images), or appropriately configured 2-D images (e.g., RGB images or depth images). As shown in block 34, a processor 18 (FIG. 1) may be configured to find, based on the different views provided by the captured images, candidate grasp locations to perform a grasp of a respective object of the one or more objects of the objects 20 in the environment of the robotic manipulator.

As shown in block 36, processor 18 may be configured to calculate respective values indicative of grasp quality for the candidate grasp locations. As shown in block 37, based on the calculated respective values indicative of grasp quality for the candidate grasp locations, processor 18 may be configured to select a grasp location and trajectory likely to result in a successful grasp of the respective object of the one or more objects of the objects 20 in the environment of the robotic manipulator. For example, the selected grasp location may be, but need not be, a grasp location with the highest likelihood of success. Prior to return step 39, as shown in block 37, processor 18 may be configured to command motion of robotic manipulator 12 along the selected trajectory to reach the selected grasp location.

Without limitation, processor 18 may be configured to command gripper 16 to execute a grasping at the selected grasp location to grasp the respective object of the one or more objects of the objects 20 in the environment of the robotic manipulator.

Without limitation, processor 18 may be configured to perform grasp motion planning on-the-fly. That is, after detecting new candidate grasp location with higher grasp quality, processor 18 may be configured to calculate in real-time a new trajectory from a present position to the new grasp location.

As will be appreciated by one skilled in the art, the terms "real-time", "on-the-fly" or similar may be applied without limitation in the context of applications when a guarantee response to input stimuli is to be performed within a specified time limit (such as without limitation in the order of milliseconds, microseconds or faster), often referred to as a "deadline". For example, in an application involving a vehicle's autonomous control system, to make appropriate decisions, the sensor signals must be received and processed practically in true real-time, otherwise the consequences could be undesirable. There may be applications when a grasping action need not be performed in true real time with respect to the calculation of a given grasp location and trajectory.

The goal of grasp motion planning on-the-fly is to maximize the likelihood of a successful grasp. In addition, trajectory re-planning does not require returning to an initial position. This reduces the overall time involved for realizing a successful grasp.

When the commanded grasp at the selected grasp location results in an unsuccessful grasp of the respective object of the one or more objects of the objects 20 in the environment of the robotic manipulator, in one non-limiting embodiment, from the previously calculated respective values indicative of grasp quality for the candidate grasp locations, processor 18 may be configured to select a further grasp location likely to result in a successful grasp of the respective object of the one or more objects of the objects 20 in the environment of the robotic manipulator. That is, in case the grasp fails, (e.g., the respective object being picked up slips from gripper 16), the disclosed imaging-based system essentially in real-time would detect such an issue. In such a case, robotic manipulator 12 need not move back along the original trajectory but can simply try again to execute on the spot a new grasp of the respective object, based on the further grasp candidates.

It will be appreciated that in a practical scenario the object could have shifted after an unsuccessful grasp. In such a situation, to perform another grasp at the new location, one would perform a registration of the object and grasp locations based on the new location of the object. (As will be appreciated by one skilled in the art, the object registration would compute the difference in location between the initial grasp attempt and the current location of the object). Without limitation, this registration, for example, can be performed based on a 2D red, green, and blue (RGB) image of the camera which can operate at a relatively short distance to the object (a 3D point cloud camera that may be used to compute grasp candidates generally involves a larger distance from the object).

Without limitation, processor 22 may be configured to assign a penalty to the selected grasp location, which resulted in the unsuccessful grasp of the respective object. As should be now appreciated, this ensures that the disclosed system is not stuck repeating an unfavorable operation (i.e., repeating grasps at an unsuccessful grasp location). As suggested above, the next grasp attempt may be executed at the next best grasp quality location identified (e.g., different local optima from a previously stored set of grasp candidates).

In one non-limiting embodiment, as shown in FIG. 3, subsequent to start step 40, as shown in block 42, processor 18 may be configured to define an updated trajectory of robotic manipulator 12, such as based on the different views provided by the captured images. For example, presuming an initial grasp location is found having an acceptable grasp quality, in one non-limiting embodiment, new grasp locations may be evaluated along the trajectory of the robotic manipulator to that initial grasp location, allowing refinement of the trajectory or re-planning the trajectory for a more suitable grasp candidate.

Without limitation, the updated trajectory can be selected to provide maximum additional information regarding the objects (presuming that images are taken during movement of the robotic manipulator). Without limitation, the updated trajectory may be further based on the best next grasping location, which may be compiled from analysis of grasps given different view positions and angles of the camera. It will be appreciated that the next grasping location can be on the same object or can be on a different object. For example, FIG. 6 illustrates a single coffee mug, but in a practical case where multiple coffee mugs may be involved, the grasping location corresponding to handle 21 of the coffee mug shown in image $22_3$ could be the handle of a different mug. That is, a different coffee mug from the coffee mug shown in previous images $22_1$ and $22_2$.

This process may be conducive to a superior level of optimization without sacrificing time efficiency. That is, without sacrificing operational speed. For example, as shown in block 44, during motion of robotic manipulator 12 along the updated trajectory, imaging sensor 14 may be arranged to capture further images providing further different views of the one or more objects of the objects 20 in the environment of robotic manipulator 12.

As shown in block 46, processor 18 may be configured to determine, based on the further different views provided by the further images of the one or more objects of the plurality of objects 20 in the environment of the robotic manipulator, further candidate grasp locations for performing the grasp of the respective object of the one or more objects of the objects 20 in the environment of the robotic manipulator. As shown in block 47, processor 18 may be configured to calculate respective values indicative of grasp quality for the further candidate grasp locations. Prior to return step 49, as shown in block 48, based on the calculated respective values indicative of grasp quality for the further candidate grasp locations, processor 18 may be configured to select a grasp location and trajectory likely to result in a successful grasp of the respective object of the one or more objects of the objects 20 in the environment of the robotic manipulator.

Figure 4:
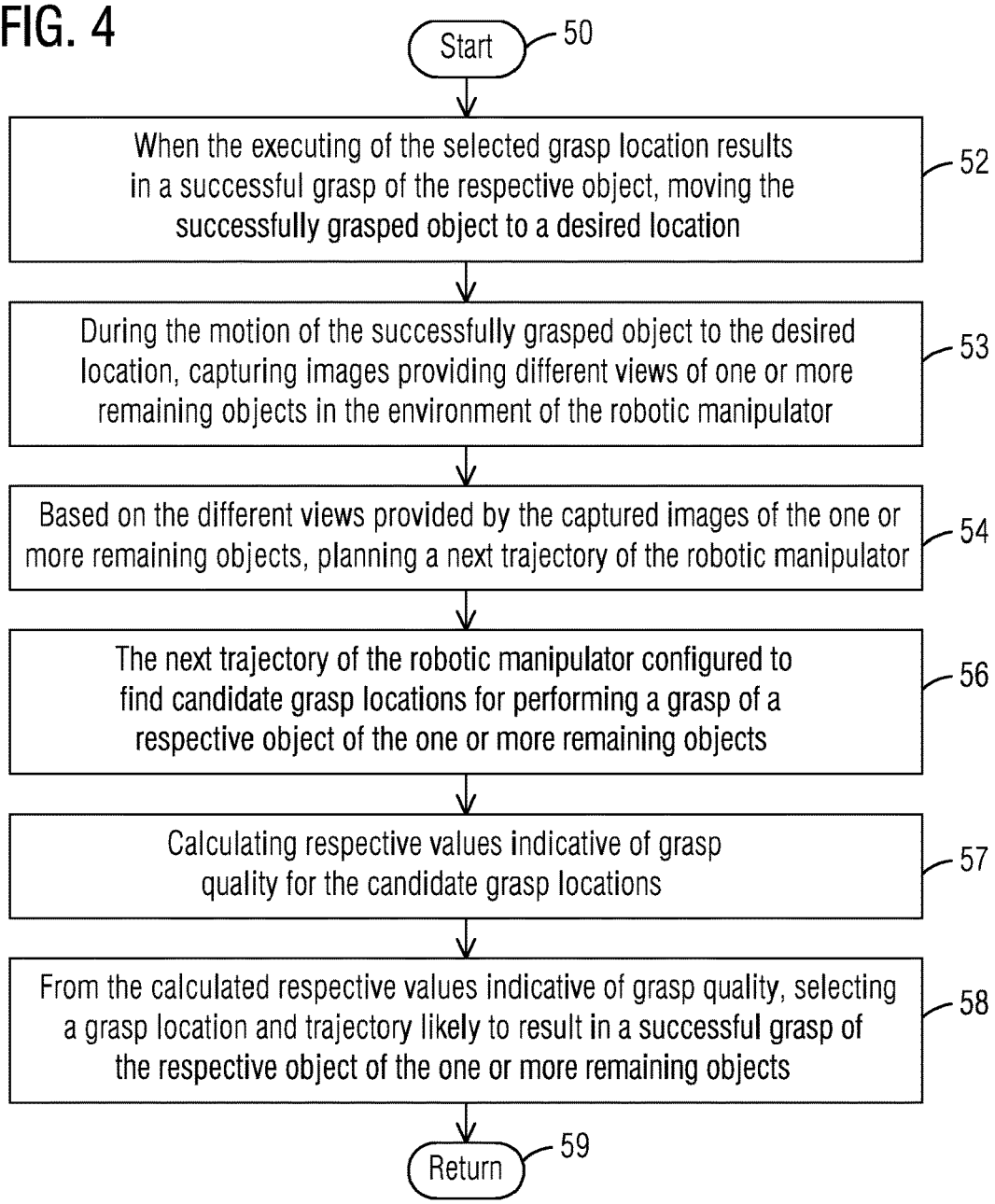

In one non-limiting embodiment, as shown in FIG. 4, subsequent to start step 50, as shown in block 52, when the commanded grasp at the selected grasp location results in a successful grasp of the respective object of the one or more objects of the objects 20 in the environment of the robotic manipulator. As shown in block 53, during the move of the successfully grasped object to the desired location, imaging sensor 14 may be configured to capture images providing different views of one or more remaining objects of the objects in the environment of the robotic manipulator.

For example, operational speed can be gained by evaluating new candidate grasp locations while the robotic manipulator with the successfully grasped object is moving to a desired location of the such object. It is contemplated that in certain situations, e.g., substantially difficult-to-grasp objects, the disclosed system may be configured to actively move such objects (e.g., by way of active perception) and scan the objects from various sides to identify optimal grasp candidates.

As shown in block 54, based on the different views provided by the captured images of the one or more remaining objects of the objects 20 in the environment of the robotic manipulator, processor 18 may be configured to plan a next trajectory of robotic manipulator 12. As shown in block 56, the next trajectory of the robotic manipulator may be configured to find candidate grasp locations to execute a grasp of a respective object of the one or more remaining objects of the objects in the environment of the robotic manipulator. Prior to return step 59, as shown in block 58, from the determined candidate grasp locations, processor 18 may be configured to select a grasp location and trajectory likely to result in a successful grasp of the respective object of the one or more remaining objects of the objects in the environment of the robotic manipulator.

In one non-limiting embodiment, as shown in FIG. 5, subsequent to start step 60, as shown in block 62, concurrent with the finding of candidate grasp locations for performing the grasp of the respective object of the one or more objects of the objects in the environment of the robotic manipulator, processor 18 may be configured to process the captured images to make a visual assessment of objects in the environment of the robotic manipulator to plan a next trajectory of the robotic manipulator. Prior to return step 66, as shown in block 64, the next trajectory may be configured to find candidate grasp locations and trajectories for performing a next grasp of another respective object of the objects in the environment of the robotic manipulator. This approach where, for example, one can proactively perform a visual assessment of objects in the environment of the robotic manipulator to plan a next trajectory of the robotic manipulator while moving the robotic manipulator toward an object of interest along a present trajectory is believed to substantially increase performance of disclosed embodiments compared to known approaches.

Figure 7:
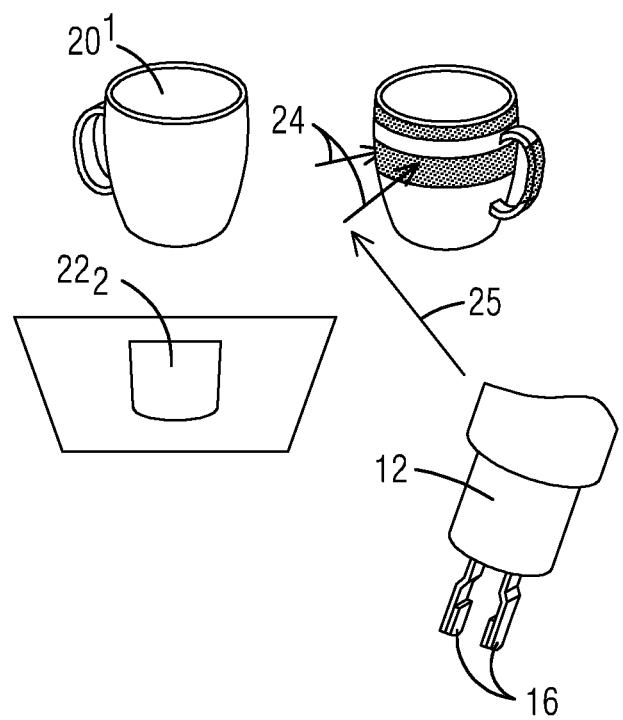
FIGS. 7 and 8 respectively illustrate non-limiting flow sequences for grasping the coffee mug.
Figure 8:
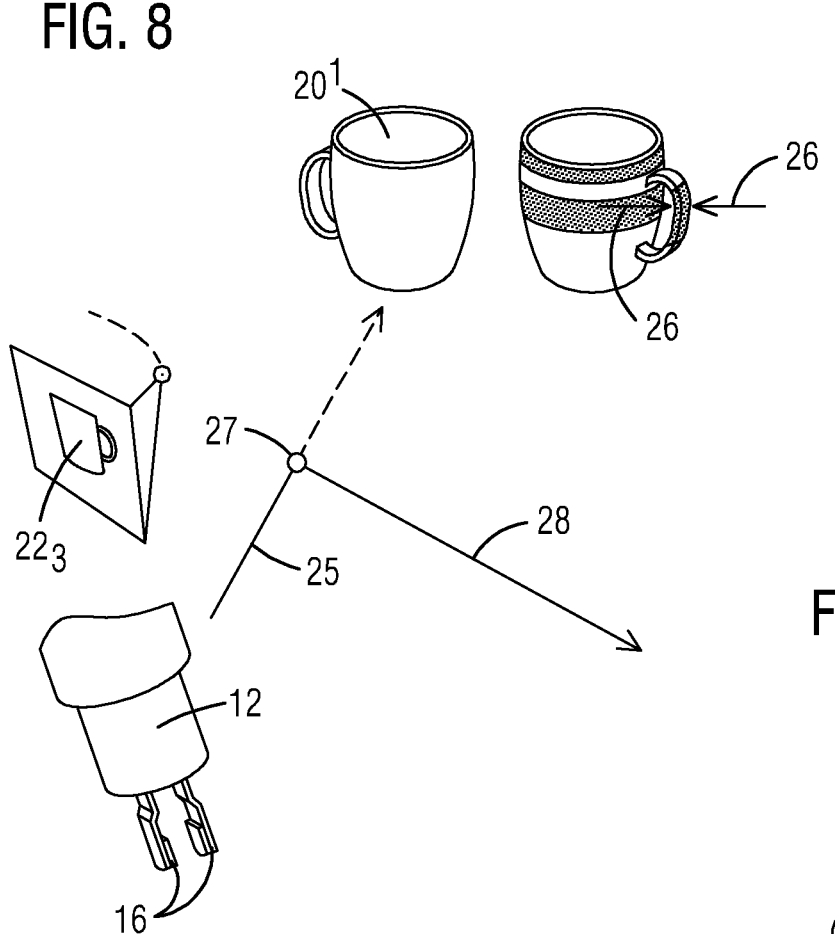

FIGS. 7 and 8 respectively illustrate non-limiting flow sequences for grasping coffee mug $20^1$. The flow sequence shown in FIG. 7 may be based on an initial image $22_1$ of coffee mug $20^1$ where the handle 21 of coffee mug $20^1$ is not observable. Based on initial image $22_1$, the disclosed system may find an initial grasp location (schematically represented by arrows 24) for picking up coffee mug $20^1$ and may plan an initial trajectory 25 for gripper 16 (attached to robotic manipulator 12) to reach such initial grasp location.

The flow sequence shown in FIG. 8 may occur while the disclosed system is executing initial trajectory 25 planned to reach initial grasp location 24 (FIG. 7). For instance, at a certain point 27 along trajectory 25, the handle 21 of coffee mug 20' becomes visible, as shown in image $22_2$. Then, based on image $22_2$ that shows the handle 21 of coffee mug 20', a new grasping location (schematically represented by arrows 26 in correspondence with handle 21) with a higher grasp quality may be found. In this case, a new trajectory 28 may be preplanned for gripper 16 to reach such new grasp location. It is noted that robotic manipulator 12 can proceed from point 27 along new trajectory 28 to reach the new grasp location. That is, robotic manipulator 12 does not need to go back toward the initial position on initial trajectory 25. It will be appreciated that this feature is conducive to time efficient performance of tasks involved for robotic picking and handling of objects.

Figure 9:
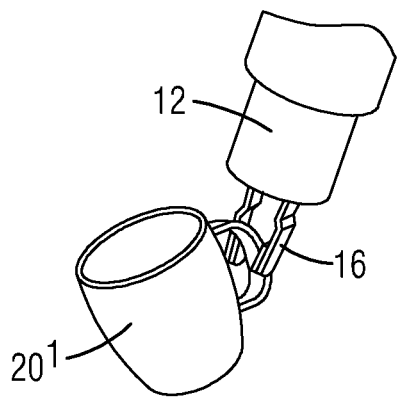
FIG. 9 illustrates a non-limiting grasping event where the coffee mug is being picked up. Said grasping event resulting from the flow sequences illustrated in FIGS. 7 and 8.

FIG. 9 illustrates a non-limiting grasping action performed by gripper 16 for picking up coffee mug 20' at grasp location 26 in correspondence with the handle 21 of coffee mug 20'. Said grasping action resulting from the example flow sequences illustrated and discussed above in the context of FIGS. 7 and 8.

In operation, disclosed embodiments propose a cost-effective and reliable solution to technical challenges generally encountered in environments involving high-variant grasping, such as can be expected in Industry 4.0 manufacturing lines. Additionally, disclosed embodiments improve the technical capabilities that may be achieved by way of real-time, active grasp quality prediction, such as without limitation, via convolutional neural networks (CNNs). This real-time solution makes innovative use of active feedback to facilitate time-efficient and consistent grasping of unknown, highly variable objects.

In operation, disclosed embodiments may be effective in solving grasping situations, where accurately and systematically precomputing robotic grasp behavior has been generally problematic in certain prior art approaches. Examples of such situations may be, without limitation: applications involving deformable objects, arbitrary pose of objects, entanglement of objects, etc.

In operation, disclosed embodiments are effective to find grasp locations (e.g., optimized grasp locations) on-the-fly. Concurrently with the finding of such grasp locations, disclosed embodiments are effective to implement grasp motion planning on-the-fly. Without limitation, such grasp motion planning allows determining a path/trajectory between a present gripper position and a desired grasp location. This determination of a new trajectory in real-time is based on obtaining new image views with grasp locations of higher quality. Motion re-planning does not require moving back to an initial gripper position. This feature should significantly reduce the time involved for performing grasping tasks.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A computerized method comprising:
during motion of a robotic manipulator arranged to grasp objects in an environment of the robotic manipulator, capturing images with an imaging sensor of the robotic manipulator, the images providing different views of one or more objects from a plurality of objects in the environment of the robotic manipulator;

based on the different views provided by the captured images, finding candidate grasp locations for performing a grasp of a respective object of the one or more objects from the plurality of objects in the environment of the robotic manipulator;

calculating respective values indicative of grasp quality for the candidate grasp locations; and based on the calculated respective values indicative of grasp quality for the candidate grasp locations, selecting an initial grasp location and an initial trajectory likely to result in a successful grasp of the respective object of the one or more objects from the plurality of objects in the environment of the robotic manipulator; and commanding motion of the robotic manipulator along the selected initial trajectory to reach the selected initial grasp location, executing the grasp of the respective object at the selected initial grasp location with a gripper attached to the robotic manipulator, and assigning a penalty to the selected initial grasp location when the grasp of the respective object at the selected initial grasp location is unsuccessful to avoid repeating grasps at an unsuccessful grasp location, and further comprising:

defining an updated trajectory of the robotic manipulator at least based on the different views provided by the captured images, wherein new grasp locations are evaluated along the initial trajectory of the initial grasp location allowing refinement of the initial trajectory for a more suitable grasp candidate.

2. The method of claim 1, wherein, when the grasp of the respective object at the selected grasp location is unsuccessful, selecting another grasp location likely to result in a successful grasp from the calculated respective values indicative of grasp quality for the candidate grasp locations.

3. The method of claim 1, during motion of the robotic manipulator along the updated trajectory, capturing further images with the imaging sensor of the robotic manipulator, the further images providing further different views of the one or more objects of the objects in the environment of the robotic manipulator;

based on the further different views provided by the further images of the one or more objects of the objects in the environment of the robotic manipulator, finding further candidate grasp locations for performing the grasp of the respective object of the one or more objects of the objects in the environment of the robotic manipulator;

calculating respective values indicative of grasp quality for the further candidate grasp locations; and based on the calculated respective values indicative of grasp quality for the further candidate grasp locations, selecting a grasp location of the further candidate grasp locations and trajectory likely to result in a successful grasp of the respective object of the one or more objects of the objects in the environment of the robotic manipulator; and commanding motion of the robotic manipulator along the selected trajectory to reach the selected grasp location of the further candidate grasp locations.

4. The method of claim 1, wherein, when the executing of the selected grasp location results in a successful grasping of the respective object of the one or more objects of the objects in the environment of the robotic manipulator, moving the successfully grasped object to a desired location, and during the moving of the successfully grasped object to the desired location, capturing images with the imaging sensor of the robotic manipulator, the images providing different views of one or more remaining objects of the objects in the environment of the robotic manipulator.

5. The method of claim 4, based on the different views provided by the captured images of the one or more remaining objects of the objects in the environment of the robotic manipulator, planning a next trajectory of the robotic manipulator.

6. The method of claim 5, wherein the next trajectory of the robotic manipulator is configured to find candidate grasp locations for performing a grasp of a respective object of the one or more remaining objects in the environment of the robotic manipulator;

calculating respective values indicative of grasp quality for the candidate grasp locations; and from the calculated respective values indicative of grasp quality for the candidate grasp locations, selecting a grasp location and trajectory likely to result in a successful grasp of the respective object of the one or more remaining objects in the environment of the robotic manipulator; and commanding motion of the robotic manipulator along the selected trajectory to reach the selected grasp location to grasp the respective object of the one or more remaining objects.

7. The method of claim 1, concurrent with the finding of candidate grasp locations for performing the grasp of the respective object of the one or more objects of the objects in the environment of the robotic manipulator, processing the captured images to make a visual assessment of objects in the environment of the robotic manipulator to plan a next trajectory of the robotic manipulator, the next trajectory configured to find candidate grasp locations and trajectories for performing a next grasp of another respective object of the objects in the environment of the robotic manipulator.

8. A computerized system comprising:

a robotic manipulator arranged to grasp a plurality of objects in an environment of the robotic manipulator, the robotic manipulator including an imaging sensor;

a gripper attached to the robotic manipulator, wherein during motion of a robotic manipulator, the imaging sensor is arranged to capture images providing different views of one or more objects of the plurality of objects in the environment of the robotic manipulator; and a processor configured to:

find, based on the different views provided by the captured images, candidate grasp locations to perform a grasp of a respective object of the one or more objects of the plurality of objects in the environment of the robotic manipulator, calculate respective values indicative of grasp quality for the candidate grasp locations, based on the calculated respective values indicative of grasp quality for the candidate grasp locations, select an initial grasp location and an initial trajectory likely to result in a successful grasp of the respective object of the one or more objects in the environment of the robotic manipulator, command motion of the robotic manipulator along the selected initial trajectory to reach the selected initial grasp location, command the gripper to execute the grasp of the respective object at the selected initial grasp location, assign a penalty to the selected initial grasp location when the grasp of the respective object at the selected initial grasp location is unsuccessful to avoid repeating grasps at an unsuccessful grasp location, and define an updated trajectory of the robotic manipulator based on the different views provided by the captured images, wherein new grasp locations are evaluated along the initial trajectory of the initial grasp location allowing refinement of the initial trajectory for a more suitable grasp candidate.

9. The computerized system of claim 8, wherein, when the grasp at the selected grasp location is unsuccessful, the processor is configured to select another grasp location and trajectory likely to result in a successful grasp from the calculated respective values indicative of grasp quality for the candidate grasp locations.

10. The computerized system of claim 8, wherein, during motion of the robotic manipulator along the updated trajectory, the imaging sensor is arranged to capture further images providing further different views of the one or more objects of the objects in the environment of the robotic manipulator, wherein the processor is configured to determine, based on the further different views provided by the further images of the one or more objects of the plurality of objects in the environment of the robotic manipulator, further candidate grasp locations for performing the grasp of the respective object of the one or more objects of the objects in the environment of the robotic manipulator, wherein the processor is configured to calculate respective values indicative of grasp quality for the further candidate grasp locations, and wherein based on the calculated respective values indicative of grasp quality for the further candidate grasp locations, the processor is configured to select a grasp location and trajectory likely to result in a successful grasp of the respective object of the one or more objects of the objects in the environment of the robotic manipulator.

11. The computerized system of claim 10, wherein, when the commanded grasp at the selected grasp location results in a successful grasp of the respective object of the one or more objects of the objects in the environment of the robotic manipulator, the processor is configured to command a move of the successfully grasped object to a desired location, wherein during the move of the successfully grasped object to the desired location, the imaging sensor is configured to capture images providing different views of one or more remaining objects of the objects in the environment of the robotic manipulator.

12. The computerized system of claim 11, based on the different views provided by the captured images of the one or more remaining objects of the objects in the environment of the robotic manipulator, the processor is configured to plan a next trajectory of the robotic manipulator.

13. The computerized system of claim 12, wherein the next trajectory of the robotic manipulator is configured to find candidate grasp locations to execute a grasp of a respective object of the one or more remaining objects of the objects in the environment of the robotic manipulator; and from the determined candidate grasp locations, the processor is configured to select a grasp location and trajectory likely to result in a successful grasp of the respective object of the one or more remaining objects of the objects in the environment of the robotic manipulator.

14. The computerized system of claim 8, concurrent with the finding of candidate grasp locations and trajectories for performing the grasp of the respective object of the one or more objects of the objects in the environment of the robotic manipulator, the processor is configured to process the captured images to make a visual assessment of objects in the environment of the robotic manipulator to plan a next trajectory of the robotic manipulator, the next trajectory configured to find candidate grasp locations and trajectories for performing a next grasp of another respective object of the objects in the environment of the robotic manipulator.

15. The computerized system of claim 8, wherein the imaging sensor is a camera selected from the group consisting of a camera configured to generate a three-dimensional (3-D) point cloud of a given scene, a two-dimensional (2-D) camera configured to record 2-D images from different viewpoints, and a combination of said cameras.

* * * * *